(12) United States Patent
Hsieh

(10) Patent No.: US 10,150,439 B1
(45) Date of Patent: Dec. 11, 2018

(54) ESCAPE SYSTEM FOR A SINKING CAR AND AN ULTRASONIC COMPONENT THEREOF

(71) Applicant: Jr-Hui Hsieh, Taoyuan (TW)

(72) Inventor: Jr-Hui Hsieh, Taoyuan (TW)

( * ) Notice: Subject to any disclaimer, the term of this patent is extended or adjusted under 35 U.S.C. 154(b) by 0 days.

(21) Appl. No.: 15/697,582

(22) Filed: Sep. 7, 2017

(30) Foreign Application Priority Data

Jul. 17, 2017 (TW) .............................. 106124063 A

(51) Int. Cl.
*B60R 21/0136* (2006.01)
*B60R 21/00* (2006.01)
*B60R 21/01* (2006.01)

(52) U.S. Cl.
CPC .. *B60R 21/0136* (2013.01); *B60R 2021/0016* (2013.01); *B60R 2021/0027* (2013.01); *B60R 2021/01265* (2013.01)

(58) Field of Classification Search
CPC ..................... B60R 21/0136; B60R 2021/0016
USPC .......................................................... 340/436
See application file for complete search history.

(56) References Cited

U.S. PATENT DOCUMENTS

| 2015/0217711 | A1* | 8/2015 | Kawada | ................. | B60R 21/00 |
| | | | | | 701/31.5 |
| 2016/0031397 | A1* | 2/2016 | Alamanos | ............. | H04W 4/046 |
| | | | | | 340/425.5 |
| 2016/0144787 | A1* | 5/2016 | Saward | ................. | H04N 7/181 |
| | | | | | 701/29.1 |

FOREIGN PATENT DOCUMENTS

| CN | 103481851 A | 1/2014 |
| CN | 104880512 A | 9/2015 |
| CN | 105346493 A | 2/2016 |
| CN | 105438482 A | 3/2016 |
| CN | 106080476 A | 11/2016 |
| CN | 107640117 A | 1/2018 |
| DE | 102010046959 A1 | 5/2011 |
| JP | 2000264149 A | 9/2000 |

OTHER PUBLICATIONS

Written Opinion of the International Search Authority dated Mar. 27, 2018.
International Search Report dated Mar. 27, 2018.

* cited by examiner

*Primary Examiner* — Qutbuddin Ghulamali
(74) *Attorney, Agent, or Firm* — Jackson IPG PLLC; Demian K. Jackson

(57) ABSTRACT

An escape system for a sinking car and an ultrasonic component thereof are disclosed. The ultrasonic component includes a housing and an ultrasonic module. The escape system for a sinking car includes an ultrasonic component and a motherboard. An ultrasonic signal transmission unit of the escape system for a sinking car and an ultrasonic component thereof is installed on a car to emit an ultrasonic wave. After the car fell into water, by the characteristic that when an ultrasonic wave passes through a medium, the change in the speed of the ultrasonic wave can be detected effectively because the ultrasonic wave is accelerated due to the increase in the Stiffness of that medium (such as liquid), the car sinking signal can be received and transmitted quickly, thereby actually taking the opportunities of rescue to reduce casualties.

13 Claims, 6 Drawing Sheets

ESCAPE SYSTEM FOR A SINKING CAR AND AN ULTRASONIC COMPONENT THEREOF

BACKGROUND OF THE INVENTION a) Field of the Invention

The present invention relates to an escape system for a sinking car and an ultrasonic component thereof; and more particularly to an escape system for a sinking car and an ultrasonic component thereof that can facilitate receiving and transmitting the car sinking signal quickly, so as to take opportunities of rescue.

b) Description of the Prior Art

In the government promotion information, people are often educated that when their cars fall into water accidentally, the cars may sink easily due to the weight of the engines at the car heads. When this thing happens, people in the car should keep calm, unlock the seat belt in the very first moment and open a car window as soon as possible, so that they can climb out of the car from the window before the car sinks. However, if the car has already sunk in the water completely, the car doors will not be opened easily due to the hydraulic pressure difference between the inner part and the outer part of the car, and the automatic windows will not be activated as water has entered into the car. At this moment, the car will sink completely in about 90 seconds, and the trapped persons should find a sharp object in the car in time to strike the windshields that they may have a chance of survival. On the contrary, if not being able to take the chance of escape in 90 seconds, the trapped persons will have a very little chance of survival.

A Taiwanese New Utility Patent No. M416576, "SINKING-PROOF AIRBAG SYSTEM FOR A CAR," is used to solve the abovementioned issue. This patent includes a body, an inflating device, a water gauge and a control unit. The body is provided with sides, the inflating device is mounted securely on one side of the body and includes a pressurized gas cylinder, an airbag and an airbag control module. The pressurized gas cylinder is mounted inside the body, the airbag is mounted outside the body, and the airbag control module is connected electrically to the pressurized gas cylinder and the airbag. The airbag control module includes a hoop, a pressurized gas cylinder switch and a drive. The water gauge is mounted outside the body, and the control unit is connected electrically to the water gauge and the airbag control module. Accordingly, when the water gauge has detected that the water level is too high, the inflating device can be activated to inflate the airbag quickly, thereby preventing the body from sinking, which in turn can save the life of the driver. Furthermore, a warning lamp is mounted securely on a top of the body to flash for rescue. However, when the car falls into water, the water gauge and the airbag will move upward due to the buoyancy effect of water, and the operation time of the airbag is affected by the tension of the spring, which acts as a resistant force. Therefore, the signal transmission time of the sensor is delayed, which in turn postpones the timing in inflating the airbag. Eventually, the timing in rescuing the trapped person is missed. Therefore, how to effectively facilitate transmitting the distress signal quickly when the car falls into water to take the opportunities of rescue by an innovative design is the issue to be overcome and solved for the escape system for a sinking car.

SUMMARY OF THE INVENTION

The primary object of the present invention is to provide an escape system for a sinking car and an ultrasonic component thereof, so that the car sinking signal can be received and transmitted quickly to take the opportunities of rescue. The present invention comprises primarily an ultrasonic signal transmission unit that is mounted on a car to emit an ultrasonic wave. When a car falls into water, by the characteristic that when an ultrasonic wave penetrates a medium, the ultrasonic wave will be accelerated by the increase in the Stiffness of that medium (such as liquid), the change in the speed of the ultrasonic wave can be detected effectively, which facilitates receiving and transmitting the car sinking signal quickly, thereby actually achieving the benefit in taking the chances of rescue to reduce casualties.

According to the abovementioned object, the present invention provides an ultrasonic component, which includes at least a housing and an ultrasonic module. An interior of the housing is provided with a holding space, at least a side of the housing is opened with a through-hole, and at least two shield plates are disposed correspondingly on two sides of the through-hole, wherein an angle is provided between the shield plate and the side of the housing. The ultrasonic module is disposed in the holding space and includes an ultrasonic signal transmission unit, a receiving unit, a computation unit that is connected electrically to the receiving unit, and a signal transmission unit that is connected electrically to the computation unit. The ultrasonic signal transmission unit projects an ultrasonic wave, whereas the receiving unit receives the ultrasonic wave projected by the ultrasonic signal transmission unit and analyzes the speed of the ultrasonic wave. The computation unit compares the speed of the ultrasonic wave transmitted by the receiving unit with a built-in setting of the sound speed in air. When the speed of the ultrasonic wave is larger than the built-in setting of the sound speed in air, the computation unit will generate a car sinking signal and the signal transmission unit will send out that car sinking signal through a wire communication or wirelessly.

According to the abovementioned ultrasonic component, the angle is between 5° and 65°.

According to the abovementioned ultrasonic component, the ultrasonic signal transmission unit is an ultrasonic signal transmission element or an ultrasonic signal transmission device.

According to the abovementioned ultrasonic component, the equation used by the receiving unit to analyze the speed of the ultrasonic wave is $$c = \frac{\sqrt{\beta}}{\sqrt{\rho}},$$

where c is the speed of the ultrasonic wave, $\beta$ is the Stiffness (also called the bulk modulus), and $\rho$ is the density. The non-compressiblity ratio of water is $2.2 \times 10^9$ Pa, and the Stiffness of air is $1 \times 10^9$ Pa. As the sound speed is inversely proportional to the square root of the density of the medium, the speed of the ultrasonic wave increases with the Stiffness of the medium According to the abovementioned ultrasonic component, an inner side of the through-hole can be further provided with a water permeable layer.

According to the abovementioned ultrasonic component, the water permeable layer is a layer of material containing fiber or a layer of cloth.

In addition, according to the object of the present invention, the present invention also discloses another kind of escape system for a sinking car, including at least an abovementioned ultrasonic component and a motherboard. The motherboard is connected electrically to the ultrasonic component. Upon receiving the car sinking signal transmitted by the signal transmission unit, the motherboard connects electrically a motor of the car to open at least a car window or a sunroof, as well as connects electrically an electromagnetic switch of the car to unlock at least a seat belt.

In accordance with the abovementioned escape system for a sinking car, the escape system for a sinking car can be further provided with an UPS (Uninterruptible Power Supply) which supplies electricity required by the escape system for a sinking car uninterruptedly.

In accordance with the abovementioned escape system for a sinking car, the escape system for a sinking car can be further connected electrically to an APP (application) inside a mobile device installed in the car or held by the driver. Upon receiving the car sinking signal, the escape system for a sinking car will activate an automatic positioning function in the APP.

In accordance with the abovementioned escape system for a sinking car, the APP can further send out a distress text or dial a distress call through a voice assistance or an automatic dialing mechanism.

In accordance with the abovementioned escape system for a sinking car, the motherboard is provided with a control unit.

In accordance with the abovementioned escape system for a sinking car, the control unit can be further connected electrically to a car horn and plural car lamps, so that when the motherboard receives the car sinking signal, the horn will be activated to sound and the car lamps will be activated to flash.

Accordingly, in the escape system for a sinking car and an ultrasonic component thereof, by the characteristic that when an ultrasonic wave penetrates a medium, the ultrasonic wave will be accelerated by the increase in the Stiffness of that medium (such as liquid), the change in the speed of the ultrasonic wave can be detected effectively. This will facilitate receiving and transmitting the message of car sinking, thereby actually achieving the benefit in taking the opportunities of rescue to reduce casualties.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

For the examiners to understand the technical features, the content, and the advantages of the present invention, as well as the benefits that the present invention can achieve, the present invention is hereinafter described in details with the accompanying drawings and the expression in the form of an embodiment. The drawings used in the description are only for illustration and as assistance to the specification, which may not be necessarily true in scale and precise configuration after the implementation of the present invention. Therefore, one should not interpret according to the scale and configuration in the accompanying drawings to limit the claims of the present invention on practical implementation.

Figure 1:
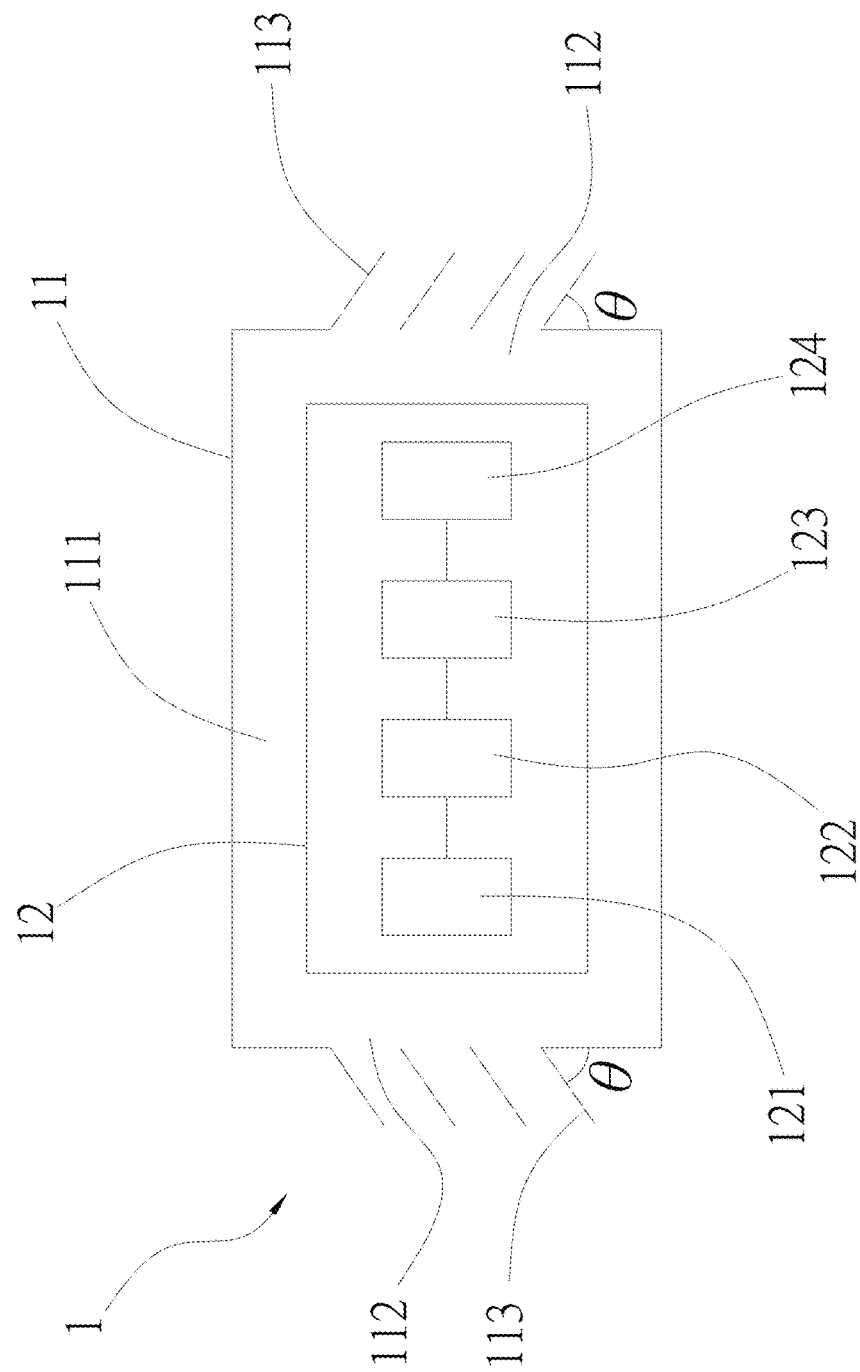
FIG. 1 shows a block diagram of provision of a first preferred embodiment of an ultrasonic component, according to the present invention.

First, as shown in FIG. 1, it shows a block diagram of provision of a first preferred embodiment of an ultrasonic component according to the present invention. The ultrasonic component 1 comprises at least a housing 11 and an ultrasonic module 12. An interior of the housing 11 is provided with a holding space 111. Each of the two opposite sides of the housing 11 is opened at least with a through-hole 112, and at least two shield plates 113 are provided correspondingly on two sides of the through-hole 112, wherein an angle θ is provided between the shield plate 113 and the side of the housing 11. In addition, that angle θ is between 5° and 65°. In the first preferred embodiment of the present invention, the housing 11 is in a rectangular shape, and an interior thereof is formed with a holding space 111. Each of the two sides of the housing 11 is opened with at least a through-hole 112, and four shield plates 113 are provided correspondingly on two sides of the through-hole 112. An angle θ in 5° to 65° between the shield plate 113 and the side of the housing 11 prevents water from splashing into the housing 11 directly by a user washing the car, raining or other non-sinking factor, thereby resulting in misjudgment.

The ultrasonic module 12 is disposed in the holding space 111 and includes an ultrasonic signal transmission unit 121, a receiving unit 122, a computation unit 123 that is connected electrically to the receiving unit 122, and a signal transmission unit 124 that is connected electrically to the computation unit 123. The ultrasonic signal transmission unit 121 projects an ultrasonic wave, whereas the receiving unit 122 receives the ultrasonic wave projected by the ultrasonic signal transmission unit 121 and analyzes the speed of the ultrasonic wave. The computation unit 123 compares the speed of the ultrasonic wave transmitted by the receiving unit 122 with a built-in setting of the sound speed in air. When the speed of the ultrasonic wave is larger than the setting of the sound speed in air, the computation unit 123 will generate a car sinking signal, and the signal transmission unit 124 will send out the car sinking signal through a wire communication or wirelessly. Besides that, the ultrasonic signal transmission unit 121 is an ultrasonic signal transmission element or an ultrasonic signal transmission device. In the first preferred embodiment of the present invention, the ultrasonic signal transmission unit 121 that manifests an ultrasonic signal transmission element emits an ultrasonic wave, whereas the receiving unit 122 receives the ultrasonic wave projected by the ultrasonic signal transmission unit 121 and analyzes the speed of the ultrasonic wave. The equation that the receiving unit 122 uses to analyze the speed of the ultrasonic wave is $$c = \frac{\sqrt{\beta}}{\sqrt{\rho}},$$

where c is the speed of the ultrasonic wave, $\beta$ is the Stiffness (also called the bulk modulus), and $\rho$ is the density. The Stiffness of water is $2.2 \times 10^9$ Pa, and the Stiffness of air is $1 \times 10^5$ Pa. Therefore, the speed of the ultrasonic wave increases with the Stiffness of the medium. Next, the computation unit 123 compares the speed of the ultrasonic wave transmitted by the receiving unit 122 with a built-in setting of the sound speed in air. If the speed of the ultrasonic wave is larger than the setting of sound speed in air, the computation unit 123 will generate a car sinking signal, and the signal transmission unit 124 will send out the car sinking signal through a wire communication or wirelessly. It is due to that when the car falls into water and after an ultrasonic wave penetrates a medium, the speed of the ultrasonic wave is changed to detect whether the car falls into water, because the speed of the ultrasonic wave increases with the increase in the Stiffness of the medium (such as liquid). In addition, as the ultrasonic wave transmits rapidly, it will facilitate sending out the car sinking signal quickly upon receiving that car sinking signal immediately, thereby taking the chances of rescue.

Figure 2:
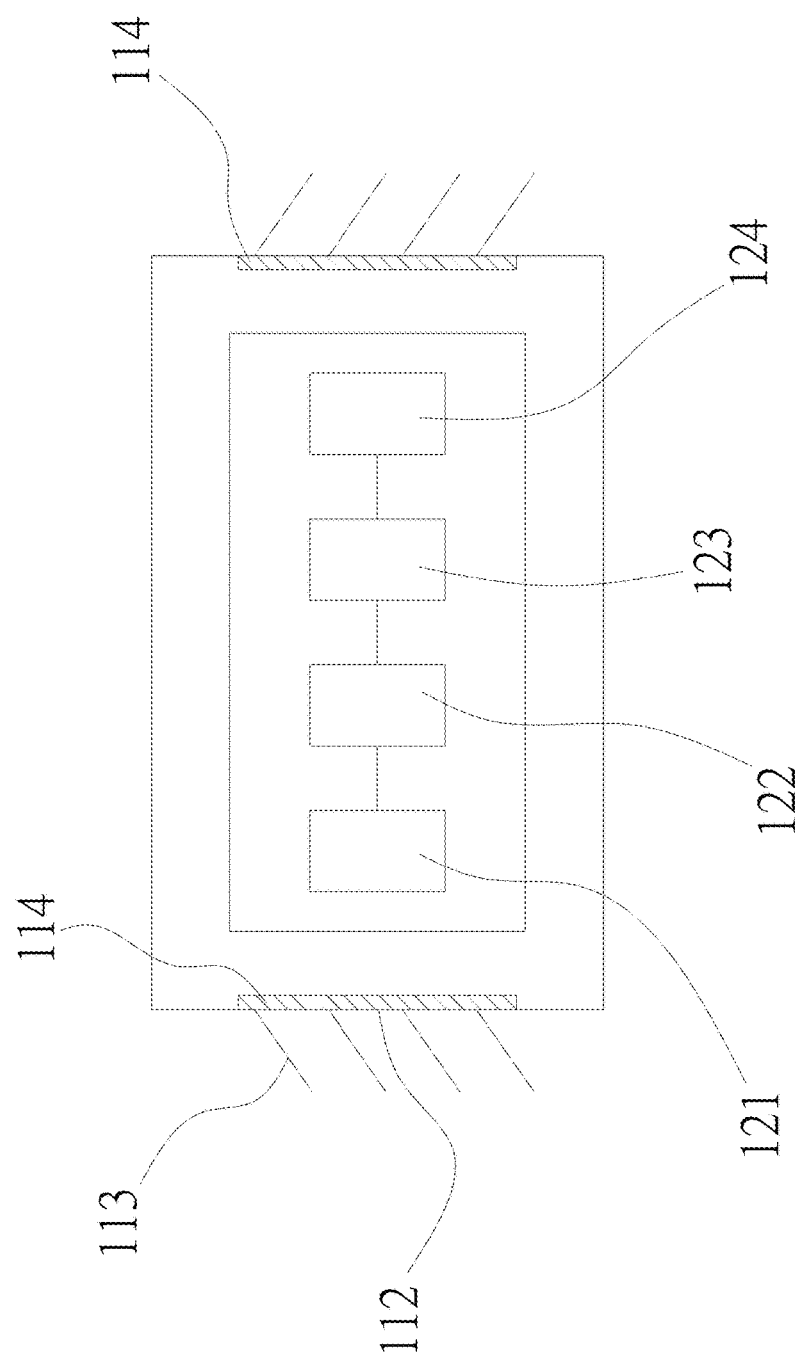
FIG. 2 shows a block diagram of provision of a second preferred embodiment of the ultrasonic component, according to the present invention.

Furthermore, an inner side of the through-hole 112 is further provided with a water permeably layer 114 that is a layer of material containing fiber or a layer of cloth. Referring to FIG. 2 together, it shows a block diagram of provision of a second preferred embodiment of the ultrasonic component, according to the present invention. The water permeable layer 114, which manifests as a layer of material containing fiber or a layer of cloth, is disposed inside the through-hole 112 and can be used to block dusts outside the through-hole 112, which prevents from the misjudgment by the dusts to affect the operation of the car sinking signal.

Figure 3:
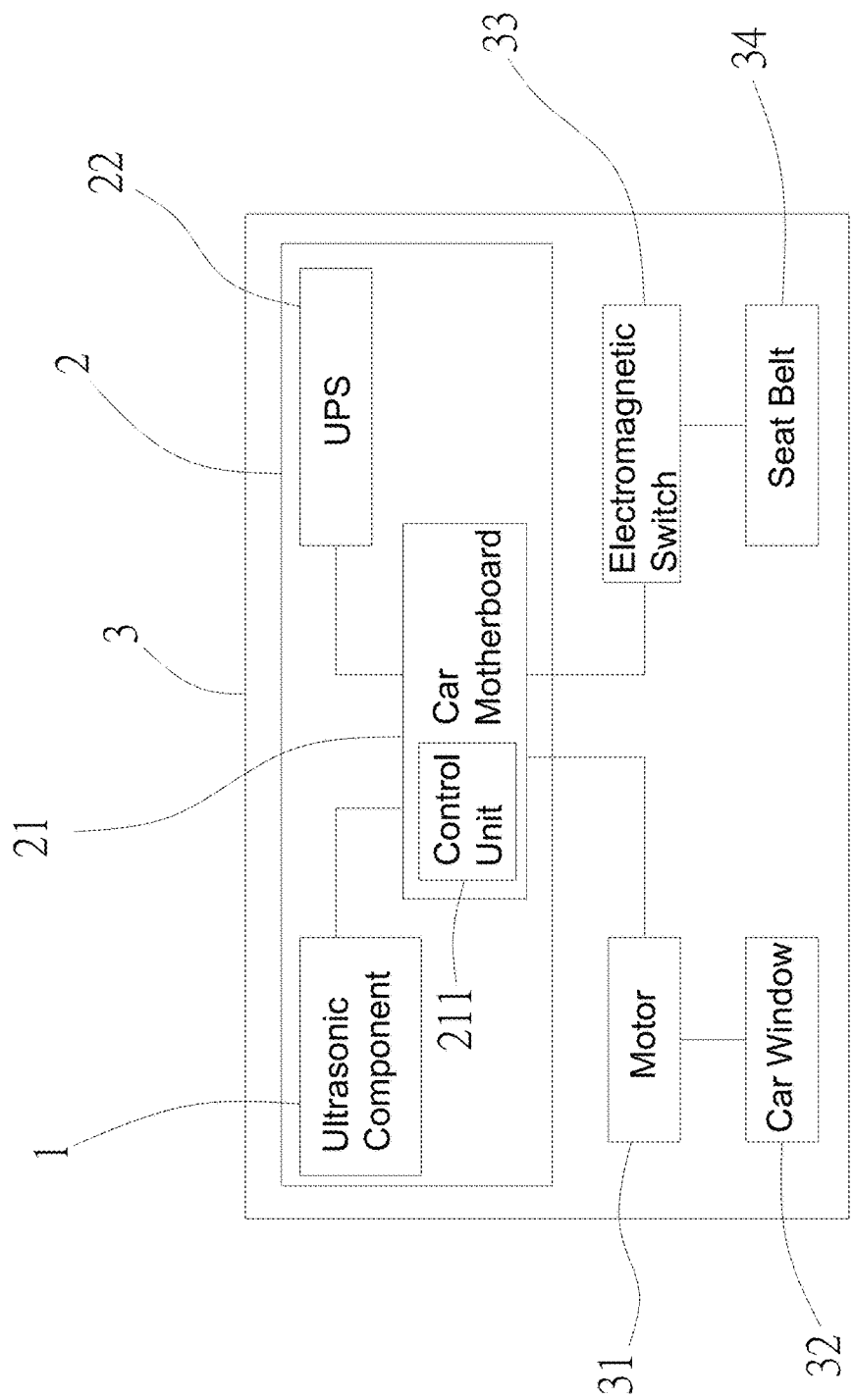
FIG. 3 shows a block diagram of provision of a first preferred embodiment of an escape system for a sinking car, according to the present invention.
Figure 4:
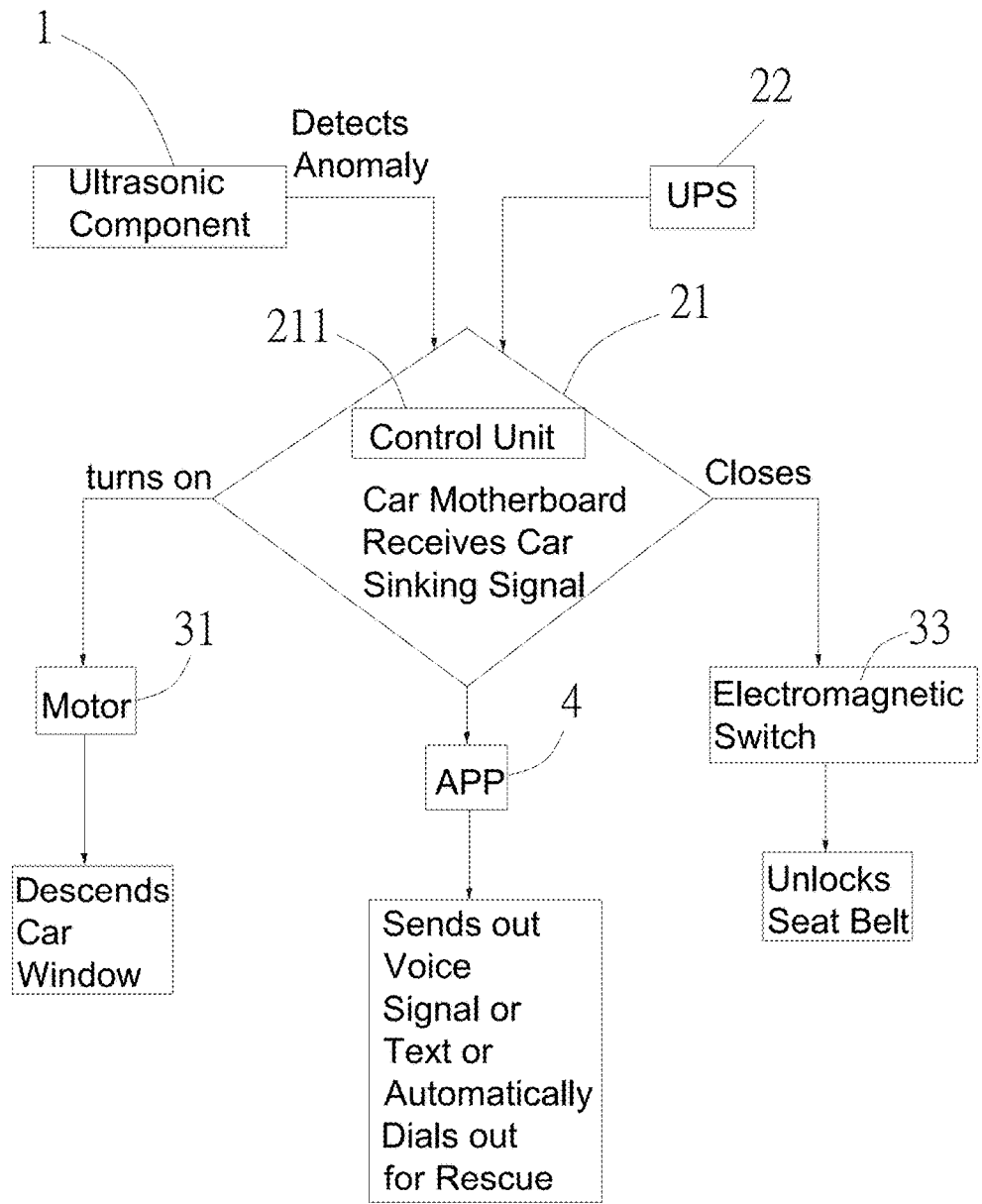
FIG. 4 shows a block diagram of an operation of the first preferred embodiment of the escape system for a sinking car, according to the present invention.

Moreover, to achieve the abovementioned object, the present invention also discloses another kind of escape system for a sinking car 2. Referring to FIG. 3 and FIG. 4, it shows a block diagram of provision and a block diagram of an operation, of a first preferred embodiment of an escape system for a sinking car, according to the present invention. The escape system for a sinking car 2 comprises at least an abovementioned ultrasonic component 1 and a motherboard 21, wherein the motherboard 21 is connected electrically to the ultrasonic component 1. Upon receiving the car sinking signal transmitted by the signal transmission unit 124, the motherboard 21 connects electrically a motor 31 of a car 3 to open at least a car window 32, and connects electrically an electromagnetic switch 33 of the car 3 to unlock at least a seat belt 34. In addition, the escape system for a sinking car 2 is further provided with an UPS 22 which supplies electricity required by the escape system for a sinking car 2 uninterruptedly. In the first preferred embodiment of the present invention, the escape system for a sinking car 2 includes an abovementioned ultrasonic component 1 and a motherboard 21. The motherboard 21 is provided with a control unit 211, and the control unit 211 is connected electrically to the motor 31 and the electromagnetic switch 33 of the car 3, wherein the motor 31 is connected electrically to the car windows 32, and the electromagnetic switch 33 is connected electrically to the seat belts 34 of the car 3. After the car 3 fell into water and the motherboard 21 received a car sinking signal transmitted by the electrically connected lighting unit 124, the motherboard 21 will open at least a car window 32 through the motor 31, and unlock at least a seat belt 34 through the electromagnetic switch 33, which facilitates persons in the car 3 to escape successfully. In addition, after the car 3 fell into water and lost power, the UPS 22 will supply electricity required by the escape system for a sinking car 2.

Furthermore, at least an ultrasonic component 1 can be installed on the front side of a car 3 head, the rear side of a car tail, inside the front left door, inside the front right door, inside the rear left door and inside the rear right door, respectively. When the ultrasonic component 1 on the front side of the car head detects anomaly, the motherboard 21 will notify the motors that activate the car windows on the left and right doors at the front and rear side, as well as the sunroof, in order to descend the car windows and open the sunroof. When the ultrasonic component 1 on the rear side of the car tail detects anomaly, the motherboard 21 will notify the motors that activate the car windows on the left and right doors at the front and rear side, as well as the sunroof, in order to descend the car windows and open the sunroof. When the ultrasonic component 1 inside the front left door or the ultrasonic component 1 inside the rear left door detects anomaly, the motherboard 21 will notify the motors that activate the car windows on the front right door and the rear right door, as the direction of escape is opposite to the direction that the car fell into water. When the ultrasonic component 1 inside the front right door or the ultrasonic component 1 inside the rear right door detects anomaly, the motherboard 21 will notify the motors that activate the car windows on the front left door and the rear left door. Moreover, the sunroof on a top of the car 3 can be installed with an ultrasonic component 1. When the ultraonic component 1 on the top of the car detects anomaly, the motherboard 21 will control to close the sunroof and to activate the motors of all the car windows on the doors at the right and left side, in order to descend the car windows.

Figure 5:
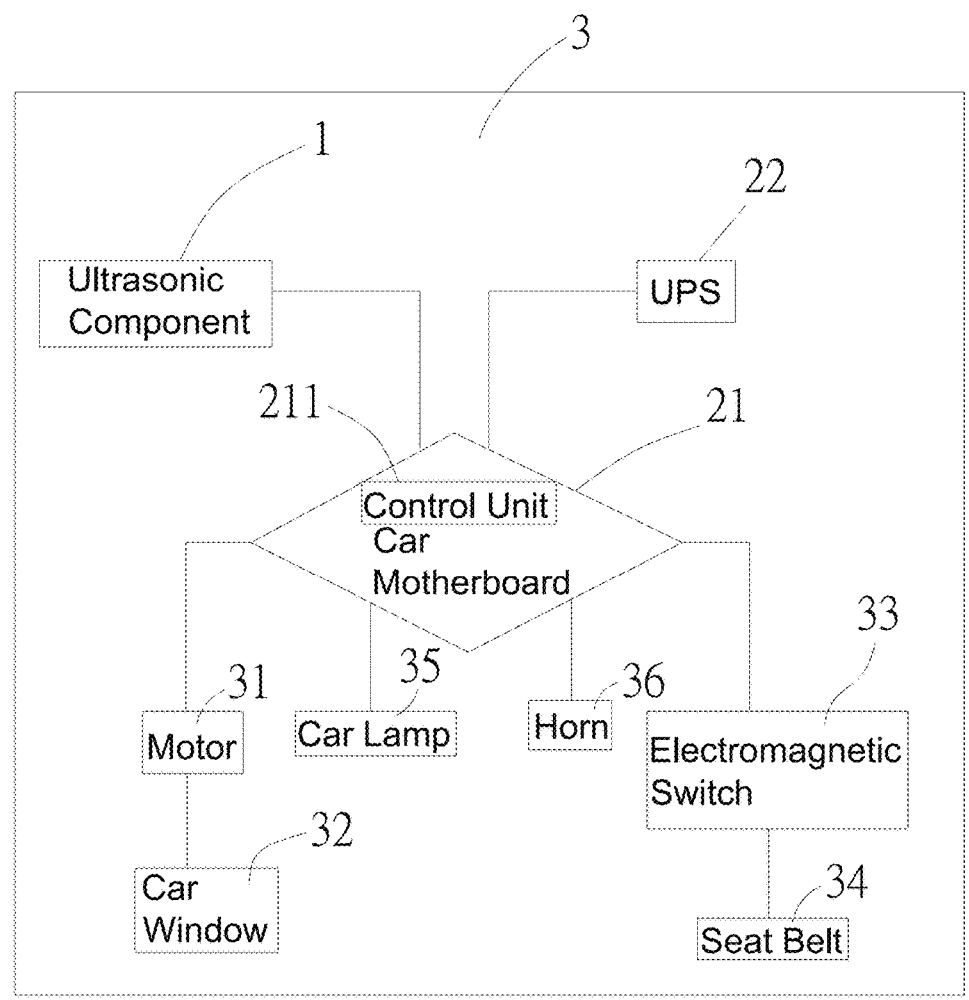
FIG. 5 shows a block diagram of provision of a second preferred embodiment of the escape system for a sinking car, according to the present invention.

On the other hand, referring to FIG. 5 together, it shows a block diagram of an operation of a second preferred embodiment of the escape system for a sinking car, according to the present invention. The escape system for a sinking car 2 can be further connected electrically to an APP 4 inside a mobile device installed in the car 3 or held by the driver. After receiving the car sinking signal, the escape system for a sinking car 2 will activate the automatic positioning function in the APP 4, wherein the APP 4 can further send out a distress text or dial a distress call through a voice assistance or an automatic dialing mechanism. In the first preferred embodiment of the present invention, an interior part of the car 2 is connected to a network and the APP 4 is therefore provided. After receiving the car sinking signal, the escape system for a sinking car 2 connects electrically the APP 4 to activate the automatic positioning function, allowing rescuers to know where the car fell into water. Furthermore, at a same time when the automatic positioning function is activated, the APP 4 can further send out a distress text through a voice assistance, so that the rescuers can be simultaneously aware of where the car fell into water.

Figure 6:
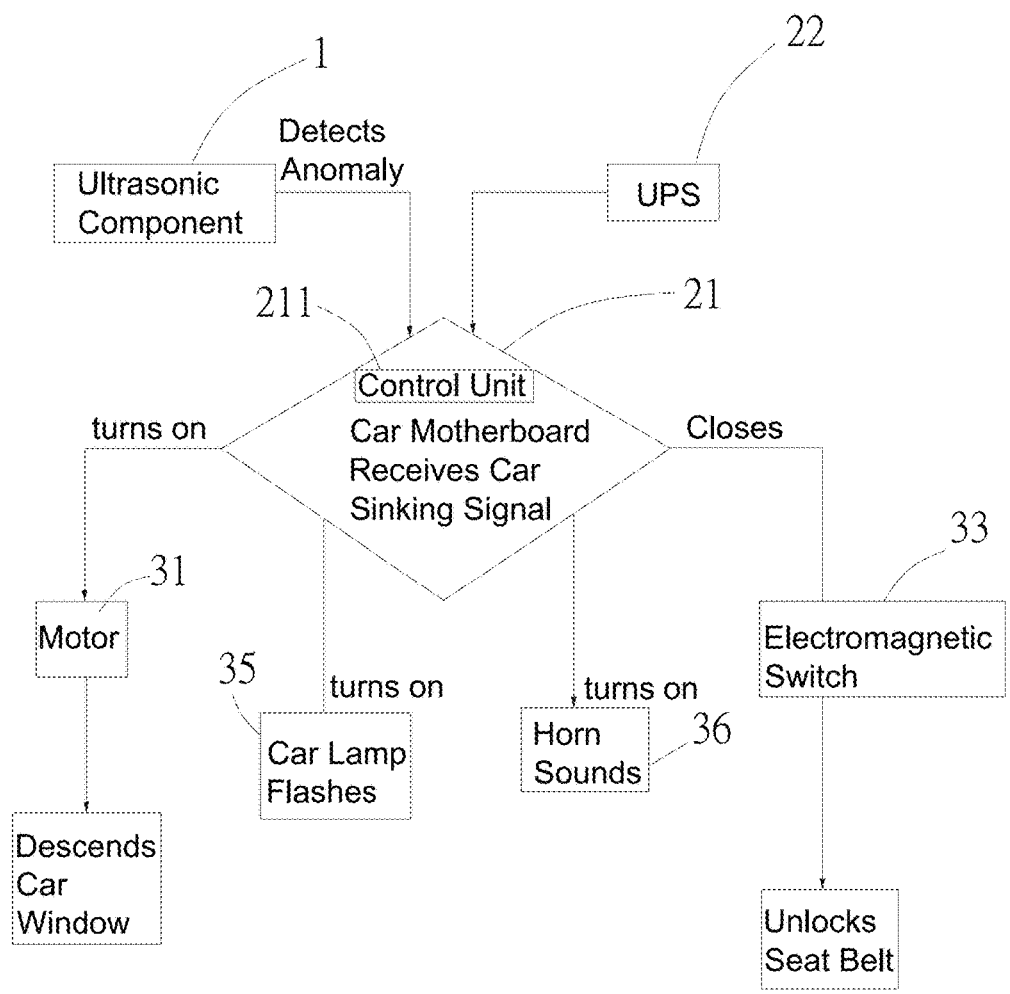
FIG. 6 shows a block diagram of an operation of the second preferred embodiment of the escape system for a sinking car, according to the present invention.

Moreover, as shown in FIG. 5 and FIG. 6, the control unit 211 of the motherboard 21 can be further connected electrically to a horn 36 and plural car lamps 35 of the car 3.

After receiving the car sinking signal, the motherboard 21 will activate the horn 36 to sound, and the car lamps 35 to flash. In the first preferred embodiment of the present invention, the motherboard 21 of the escape system for a sinking car 2 is connected electrically to the horn of the car 3. When receiving the car sinking signal, the escape system for a sinking car 2 will connect electrically the horn of the car 3 and drive the horn to sound, so that the rescuers can find out where the car fell into water through that sound.

Accordingly, in comparison with the existing technology and product, the escape system for a sinking car and an ultrasonic component thereof, in accordance with the present invention, are advantageous in that by the characteristic that when an ultrasonic wave passes through a medium, the change in the ultrasonic wave can be detected effectively because the ultrasonic wave is accelerated due to the increase in the Stiffness of the medium (such as liquid), the car sinking message can be received and transmitted quickly, so that the chances of rescue can be taken to reduce casualties.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An ultrasonic component comprising:
a housing, an interior with a holding space, and a side of which is opened with a through-hole, with two shield plates disposed correspondingly on two sides of the through-hole, and an angle is provided between each of the two shield plates and corresponding one of opposite sides of the housing; and
an ultrasonic module, which is disposed inside the holding space and includes an ultrasonic signal transmission unit, a receiving unit, a computation unit connected electrically to the receiving unit, and a signal transmission unit connected electrically to the computation unit, wherein the ultrasonic signal transmission unit projects an ultrasonic wave, the receiving unit receives the ultrasonic wave projected by the ultrasonic signal transmission unit and analyzes a speed of the ultrasonic wave, and the computation unit compares the speed of the ultrasonic wave transmitted by the receiving unit with a built-in setting of the sound speed in air; when the speed of the ultrasonic wave is larger than the built-in setting of the sound speed in air, the computation unit generating a car sinking signal, and the signal transmission unit sending out the car sinking signal through a wire communication or wirelessly.

2. The ultrasonic component according to claim 1, wherein the angle is between 5° and 65°.

3. The ultrasonic component according to claim 1, wherein the ultrasonic signal transmission unit is an ultrasonic signal transmission element or an ultrasonic signal transmission device.

4. The ultrasonic component according to claim 1, wherein the equation that the receiving unit uses to analyze the speed of the ultrasonic wave is $$c = \frac{\sqrt{\beta}}{\sqrt{\rho}}$$

where c is the speed of the ultrasonic wave, $\beta$ is the Stiffness (also called the bulk modulus), and $\rho$ is the density, with that the Stiffness of water is $2.2 \times 10^9$ Pa, the noncompressibility of air is $1 \times 10^5$ Pa, and thus the speed of the ultrasonic wave increases with the Stiffness of the medium.

5. The ultrasonic component according to claim 1, wherein an inner side of the through-hole is further provided with a water permeable layer.

6. The ultrasonic component according to claim 5, wherein the water permeable layer is a layer of material containing fiber or a layer of cloth.

7. An escape system for a sinking car, being provided on a car and comprising:
an ultrasonic component according to claim 1; and
a motherboard which is connected electrically to the ultrasonic component, wherein after receiving the car sinking signal transmitted by the signal transmission unit, the motherboard connects electrically a motor of the car to activate a car window, and connects electrically an electromagnetic switch of the car to unlock a seat belt.

8. The escape system for the the sinking car, according to claim 7, wherein the escape system for the sinking car is further provided with an Uninterruptable Power Supply which supplies electricity required by the escape system for the sinking car uninterruptedly.

9. The escape system for the sinking car, according to claim 7, wherein the escape system for the sinking car is further connected electrically to an application inside a mobile device installed in the car or held by the driver, and after receiving the car sinking signal, the escape system for the sinking car turns on an automatic positioning function in the application.

10. The escape system for the sinking car, according to claim 9, wherein the application further sends out a distress text or dials a distress call through a voice assistance or an automatic dialing mechanism.

11. The escape system for the sinking car, according to claim 7, wherein the motherboard is further connected electrically to a horn of the car and turns on the horn to sound after receiving the car sinking signal.

12. The escape system for the sinking car, according to claim 7, wherein the motherboard is provided with a control unit.

13. The escape system for the sinking car, according to claim 12, wherein the control unit is connected electrically to the motor, plural car lamps and a horn.

* * * * *